Feb. 19, 1924.
S. COHN
1,484,552
MACHINE FOR STRETCHING AND DRYING TUBULAR FABRICS
Filed July 9, 1920    3 Sheets-Sheet 1
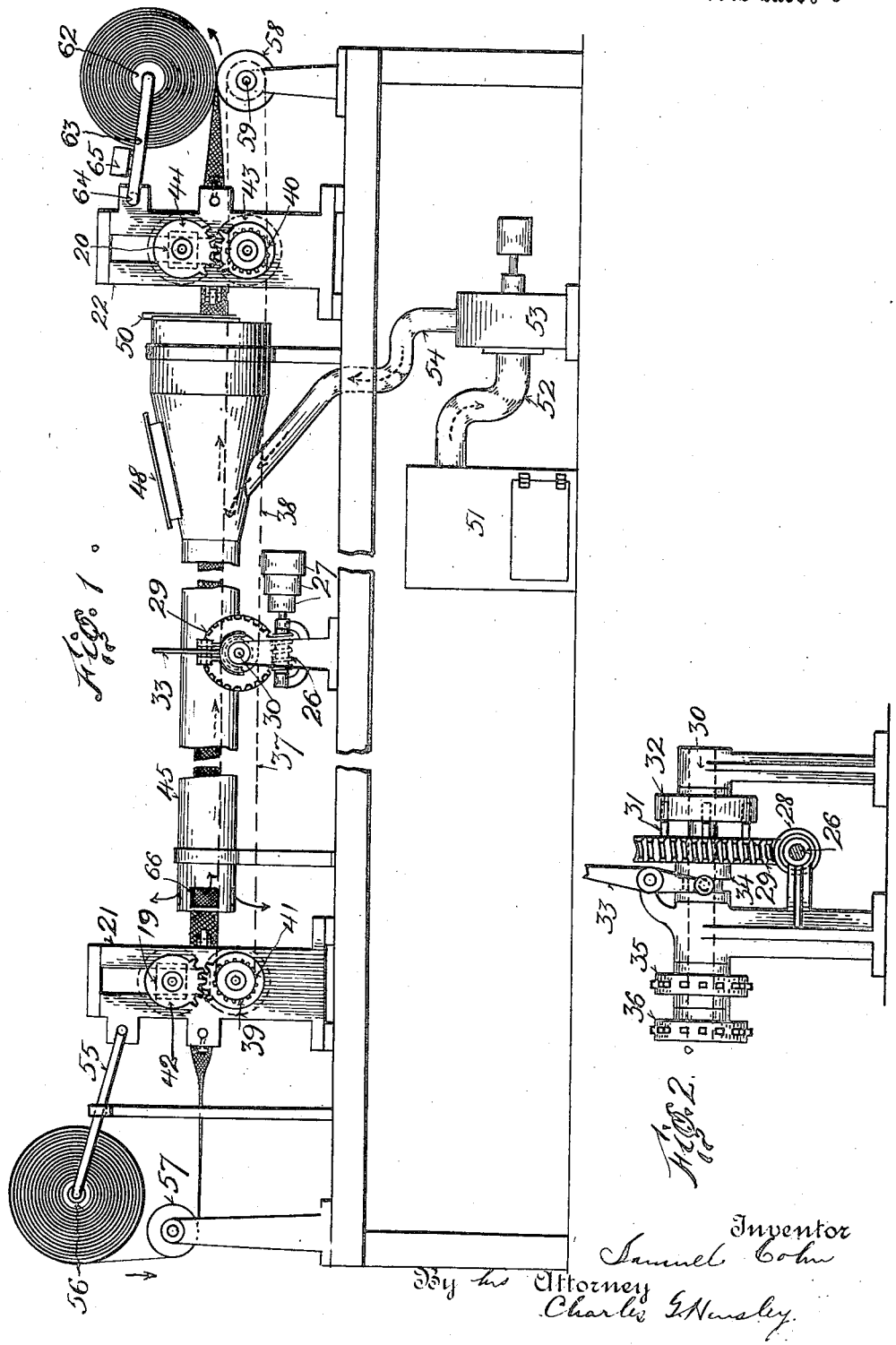
Inventor
Samuel Cohn
By his Attorney
Charles G. Hensley.

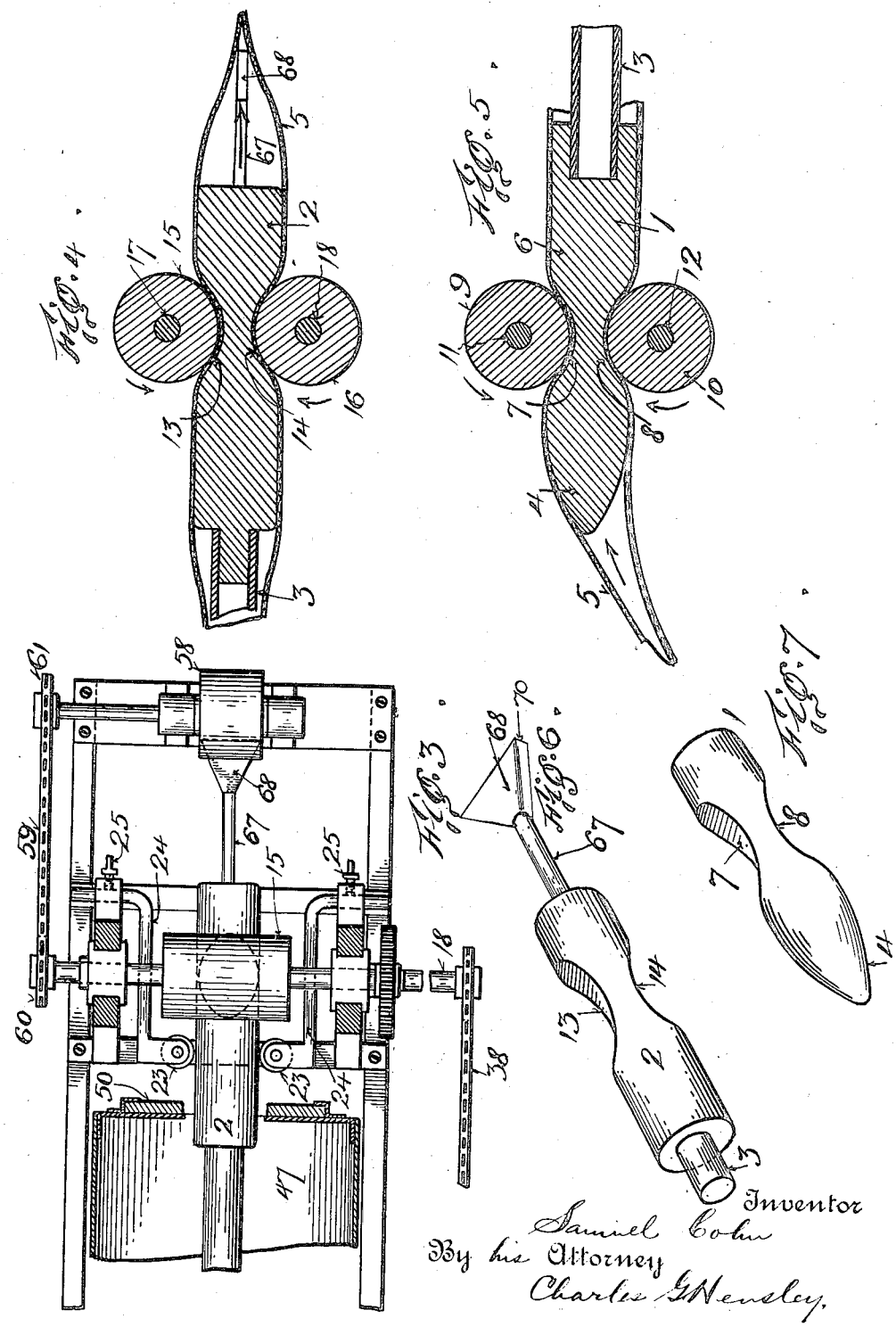

Feb. 19, 1924.
S. COHN
1,484,552
MACHINE FOR STRETCHING AND DRYING TUBULAR FABRICS
Filed July 9, 1920  3 Sheets-Sheet 3
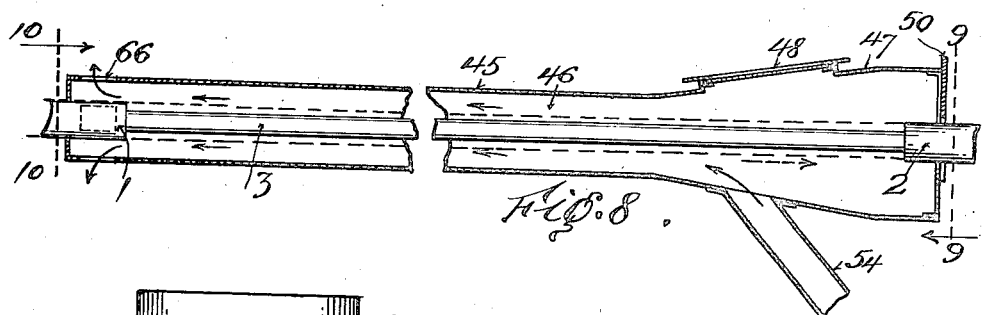
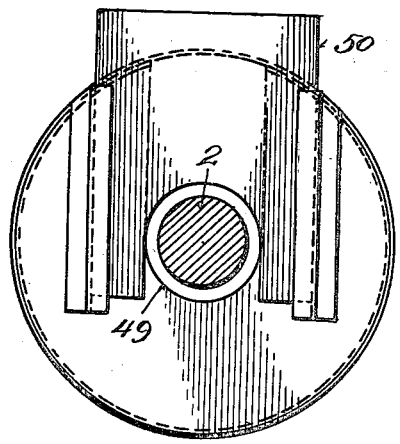
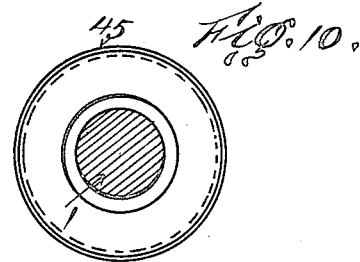
Samuel Cohn Inventor
By his Attorney
Charles G. Hursley.

Patented Feb. 19, 1924.

1,484,552

UNITED STATES PATENT OFFICE.

SAMUEL COHN, OF NEW YORK, N. Y., ASSIGNOR TO MANTLE MACHINERY & PATENTS COMPANY, OF NEW YORK, N. Y., A CORPORATION OF NEW YORK.

MACHINE FOR STRETCHING AND DRYING TUBULAR FABRICS.

Application filed July 9, 1920. Serial No. 395,056.

*To all whom it may concern:*

Be it known that I, SAMUEL COHN, a citizen of the United States, and a resident of the borough of Bronx, in the city and State of New York, have invented certain new and useful Improvements in Machines for Stretching and Drying Tubular Fabrics, of which the following is a specification.

My invention relates to improvements in machines for stretching and drying tubular fabrics and although it is not necessarily limited to use in a particular art it is especially advantageous when used for evenly stretching and drying tubular fabric from which incandescent gas mantles are made. The object of the present invention is to evenly stretch a tubular fabric and to evenly and rapidly dry it while it is stretched. The tubular fabric is propelled in a continuous piece over a mandrel which lies inside it, and by means which exerts a continuous and even propelling stress on the fabric, so that all parts thereof are stretched to the same degree.

In my U. S. Patent No. 1,313,468, I showed and described a machine for evenly stretching and drying tubular fabrics and the present machine is of the same general character. In the present case I employ a mandrel over which the fabric is propelled and on which it is stretched and dried. The fabric contacts with spaced heads of the mandrel between which it does not contact with the mandrel but is suspended under tension. The device for conducting a current of heated air over the fabric is so constructed that the rollers or propelling devices are all outside the heat chamber so that the rollers may be sufficiently lubricated without injuring the fabric and so that the rollers are always accessible. I also provide means for permitting access through the drying chamber to the mandrel and to the fabric thereon. Another object is to provide simple means for maintaining the mandrel centralized in the machine.

Another object is to provide a simple and efficient let off reel for feeding the fabric to the machine and also a simple take up device for taking up or reeling the dried fabric.

In the drawings forming part of this application:

Figure 1 is a side elevation of a machine embodying my invention,

Figure 2 is a detail view of the driving mechanism,

Figure 3 is a horizontal sectional view showing in plan the parts of the delivery end of the machine, Figure 4 is a sectional view of the mandrel and driving rollers at the delivery end of the machine, Figure 5 is a sectional view of the mandrel and rollers at the receiving end of the machine, Figure 6 is a perspective view of the delivery end of the mandrel, Figure 7 is a similar view of the receiving end of the mandrel, Figure 8 is a longitudinal sectional view of the heating chamber, Figure 9 is a sectional view taken on the line 9—9 of Figure 8, and Figure 10 is a sectional view taken on the line 10—10 of Figure 8.

The mandrel over which the tubular fabric is propelled and on which it is stretched and dried comprises end members 1 and 2 at the receiving and delivery ends respectively, and an intermediate connecting member 3. The end member 1 has a tapering nose 4 over which the fabric moves and this is followed by a portion 6 of larger diameter which distends the fabric 5 to the full extent that it is to be stretched laterally. This member 1 has arcuate grooves 7, 8, formed in the top and bottom thereof, to receive part of the peripheries of the feed rollers 9 and 10 arranged above and below the mandrel on parallel shafts 11, 12. The member 2 is preferably of the same diameter as the member 1 and it also has arcuate grooves 13, 14, for the purpose of receiving portions of the peripheries of the feed rollers 15, 16 arranged above and below the mandrel on parallel shafts 17, 18 at the delivery end of the machine. The intermediate portion 3 of the mandrel merely forms a mechanical connection between the members 1 and 2 and it is my purpose in this construction to make this member smaller in diameter in order that the fabric between the members 1 and 2 will normally remain suspended and not touch the member 3. This reduces the area of contact between the fabric and mandrel so that the latter may be as long as required to dry the fabric while moving over it. I have found that the fabric may be suspended under tension between the members 1 and 2 and at the same time it can be uniformly stretched.

The lower feed rollers 10, 16, are mounted on stationary axes whereas the upper rollers 9, 15, are mounted on shafts which have journal blocks 19, 20, which slide vertically in the standards 21, 22, so that the rollers 9, 15, press by gravity upon the mandrel which in turn presses upon the lower rollers 10, 16. All the feed rollers are preferably rubber covered and their peripheries press the fabric against the mandrel. The rollers 10, 16, engage in the recesses 8, 14, of the mandrel and the rollers 9, 15, engage in the recesses 7, 13. When these several rollers revolve they have the effect of moving the fabric along the mandrel and of preventing the latter from moving longitudinally or up or down. There are lateral guide rollers 23 which engage the sides of the mandrel to prevent lateral displacement of the latter and these are mounted on arms 24 which may be adjusted in position by means of set screws 25. These roller devices are alike at both ends of the mandrel. It will be obvious that as the rollers 23 are idlers, they do not interfere with the movement of the fabric along the mandrel.

There is a shaft 26 operated in any desired manner as by means of a belt (not shown) engaging one of the pulleys 27. There is a worm 28 on this shaft 26 which operates a worm gear 29 arranged loose on the cross shaft 30 and provided with clutch pins 31 on its face. There is a clutch member 32 feathered to the shaft 30 and it is adapted to be shifted by means of a hand lever 33 operating on the hub 34 of the clutch member for the purpose of engaging the latter with the pins 31 of the worm gear to set the shaft 30 into operation, or to disengage the clutch member to stop the latter shaft. On the shaft 30 there are sprockets 35, 36. On one of these there is a chain 37 which also travels over a sprocket 39 on the shaft 12 and on the other sprocket 35 there is a chain 38 which also travels over a sprocket 40 arranged on the shaft 18. Through these chains and sprockets operating force is transmitted from the shaft 30 to the rollers 10, 16. There are intermeshing gears 41, 42, on the shafts 12, 11, so that the rollers 10 and 9 are operated together; and there are intermeshing gears 43, 44, on the shafts 18, 17, so that the rollers 16 and 15 are operated together.

There is a tube or casing 45 surrounding the mandrel and forming between it and the mandrel an annular drying chamber 46 in which the fabric is stretched and dried. This casing is arranged between the sets of feed rollers so that the latter are not included in the drying chamber. The casing 45 preferably has an enlarged portion 47 at the delivery end, which is provided with a transparent window 48 through which the operator may observe the condition of the fabric on the mandrel. The end of the casing has an aperture 49 sufficiently large to permit the tubular fabric to pass through without contact and there is a slidable cover 50 for opening the end of the casing sufficiently to permit the operator to get his or her hand in to adjust the fabric. When the machine is in operation this cover is closed so that the opening is then just sufficient to permit the fabric to pass through it.

There is a heater 51 in which the air to be supplied to the drying chamber is heated and the heated air from this is taken through the pipe 52 by a blower 53 and it is forced through the pipe 54 into the drying chamber. The heated air is driven through the latter in the opposite direction to the movement of the fabric.

At the receiving end of the machine there are pivoted arms 55 on the ends of which a reel 56 of the fabric is supported. The fabric leads from the reel 56 under the idler 57 and from there to the mandrel. At the delivery end of the machine there is a roller 58 mounted on the shaft 59 and in the same plane as the rollers 10 and 16. This roller 58 is driven from the shaft 18 by means of a chain 59 which travels over the sprockets 60 and 61, as shown in Figure 3. Above the roller 58 there is a winding reel 62 mounted on arms 63 which swing from a pivotal point 64 and which arms are preferably weighted by means of a weight 65 to make the roller of fabric on the reel 62 press upon the roller 58. The roller 58 operates to turn the reel 62 by direct contact with the fabric which is wound on this reel. As the fabric passes through the bite of the roller 58 and the reel 62 it is wound smoothly on the latter. Though the reel increases in size as the fabric is wound upon it the latter is always taken up at the speed it is delivered from the drying apparatus (allowance being made for shrinkage of the fabric in the diameter of the roller 58) because the reel is operated by peripheral contact with the roller 58.

Operation. In setting the machine in condition for operation a reel of fabric is mounted on the support 55 and the end of the fabric is passed under the roller 57, then it is threaded over the mandrel and onto the take up reel 62. The fabric is drawn taut between the sets of rollers 9, 10, and 15, 16, and it will continue taut there while the machine is operating. The forward rollers press the fabric against the member 1 and advance the fabric onto and over this member; and they also serve to support and hold the mandrel. The rollers 15, 16 serve to draw the fabric forward from the member 1 and to advance it over the member 2, so that the fabric is drawn taut or stretched between the members 1 and 2. From the rollers 15, 16, the fabric is propelled by the roller 58 and the reel 62, on which latter it is wound. While passing between the members 1 and 2 the fabric is subjected to a current of heated air of high velocity in the chamber 46, the air traveling in the opposite direction to the fabric. The air entering the chamber 46 from the tube 54 passes through the annular space in contact with the entire circumference of the tubular fabric and it discharges through the openings 66 in the casing 45. If the fabric consists of impregnated material in wet condition it is simultaneously and evenly stretched and uniformly dried while traveling through the drying chamber. As the fabric builds up on the reel 62 the body of fabric becomes large but the periphery thereof is always in contact with the roller 58 and the fabric is wound up at a constant rate of speed. There is a rod 67 projecting from the member 2 and on this there is a fanshaped spreading board 68. This board has its widest end 70 arranged close to the bite of the reel and the roller 58 so that the fabric is flattened out to a uniform width just as it passes onto the reel.

Having described my invention what I claim is:

1. A machine for evenly stretching tubular fabric including a mandrel supported by rolling supports, over which mandrel the tubular fabric is adapted to be advanced continuously past the rolling supports, said mandrel having spaced members of relatively large diameter against which the rolling members exert a rolling pressure on the fabric to advance it, said mandrel having an intermediate connecting member between the spaced members of relatively smaller diameter whereby the fabric will be normally suspended between said spaced members.

2. A machine for evenly stretching tubular fabric including a mandrel supported by rolling supports, over which mandrel the tubular fabric is adapted to be advanced continuously past the rolling supports, said mandrel having spaced members of relatively large diameter against which the rolling members exert a rolling pressure on the fabric to advance it, said mandrel having an intermediate connecting member between the spaced members of relatively smaller diameter whereby the fabric will be normally suspended between said spaced members, means forming an annular air chamber around said mandrel, and means for forcing a current of heated air through said chamber.

3. A machine for evenly stretching and drying tubular fabric, including a mandrel supported by rolling supports, over which mandrel the tubular fabric is adapted to be advanced continuously past the rolling supports, said mandrel having spaced members of relatively large diameter against which the rolling members exert a rolling pressure on the fabric to advance it, said mandrel having an intermediate connecting member between the spaced members of relatively smaller diameter whereby the fabric will be normally suspended between said spaced members, means forming an annular air chamber around said mandrel, and means for forcing a current of heated air through said air chamber in the opposite direction to the movement of the fabric.

4. A machine for evenly stretching and drying tubular fabric, including a mandrel, cooperating pairs of rolling supports spaced apart lengthwise of the mandrel and adapted to advance the fabric over the mandrel by rolling contact therewith against the mandrel, a casing arranged between said pairs of rollers and enclosing the mandrel to form an annular air chamber around the fabric, said pairs of rolling supports being arranged outside said casings and means for forcing heated air through said chamber.

5. A machine for evenly stretching and drying tubular fabric, including a mandrel, cooperating pairs of rolling supports spaced apart lengthwise of the mandrel and adapted to advance the fabric over the mandrel by rolling contact therewith against the mandrel, a casing arranged between said pairs of rollers and enclosing the mandrel, to form an annular air chamber around the fabric, end walls on said casing having restricted openings for the passage of the fabric, a cover on one of said end walls to permit access to the fabric in said chamber, and means for forcing a current of air through said chamber.

6. A machine for evenly stretching and drying tubular fabric, including a mandrel, cooperating pairs of rollers arranged above and below the mandrel and adapted to advance the fabric over the mandrel by rolling contact therewith against the mandrel, said rollers being mounted on shafts, common means for operating the lower rollers of each pair, and intermeshing gears on the shafts of the upper and lower rollers of each pair whereby the rollers of each pair are driven in synchronism, said mandrel resting by gravity on said lower rollers and said upper rollers resting by gravity on said mandrel.

7. A machine for evenly stretching tubular fabric, including a mandrel supported by rolling supports, over which mandrel the tubular fabric is adapted to be advanced continuously past the rolling supports, and guide rollers adapted to prevent lateral displacement of said mandrel without interfering with the movement of the fabric over the mandrel.

8. A machine for evenly stretching tubular fabric, including a mandrel supported by rolling supports, over which mandrel the tubular fabric is adapted to be advanced continuously past the rolling supports, and means for winding up the treated fabric comprising a reel on which the fabric is wound, and a roller cooperating therewith and adapted to revolve said reel by peripheral contact with the fabric thereon, and a fan shaped spreader projecting from said mandrel and having its widest portion arranged near the bite of said reel and its operating roller.

Signed at the city, county, and State of New York, this 2nd day of July, 1920.

SAMUEL COHN.